(12) United States Patent
Wormald et al.

(10) Patent No.: US 8,145,222 B2
(45) Date of Patent: Mar. 27, 2012

(54) METHOD, MOBILE COMMUNICATION DEVICE, AND SYSTEM FOR SELECTIVE DOWNLOADING TO A MOBILE COMMUNICATION DEVICE

(75) Inventors: Chris Wormald, Kitchener (CA); David Tapuska, Waterloo, CA (US); Robert Edwards, Waterloo, CA (US)

(73) Assignee: Research In Motion Limited, Waterloo (CA)

( * ) Notice: Subject to any disclaimer, the term of this patent is extended or adjusted under 35 U.S.C. 154(b) by 1204 days.

(21) Appl. No.: 11/865,807

(22) Filed: Oct. 2, 2007

(65) Prior Publication Data

US 2009/0088188 A1    Apr. 2, 2009

(51) Int. Cl.
*H04W 40/00* (2009.01)
*H04M 1/00* (2006.01)
*H04M 1/725* (2006.01)
*H04L 12/58* (2006.01)

(52) U.S. Cl. .................. 455/445; 455/553.1; 455/552.1; 370/351

(58) Field of Classification Search ............... 455/552.1, 455/553.1, 445, 450, 448, 422.1; 370/229, 370/351, 352, 354
See application file for complete search history.

(56) References Cited

U.S. PATENT DOCUMENTS

| 5,838,906 | A | 11/1998 | Doyle et al. |
| 6,343,323 | B1 | 1/2002 | Kalpio et al. |
| 7,159,014 | B2 * | 1/2007 | Kausik et al. .................. 709/217 |
| 7,406,516 | B2 * | 7/2008 | Davis et al. .................... 709/224 |
| 2005/0078944 | A1 * | 4/2005 | Risan et al. ...................... 386/94 |
| 2006/0111088 | A1 * | 5/2006 | O'Rourke .................. 455/414.1 |
| 2006/0168349 | A1 | 7/2006 | Van Geest et al. |
| 2006/0234762 | A1 * | 10/2006 | Ozluturk .................... 455/552.1 |
| 2008/0242290 | A1 * | 10/2008 | Bhatia et al. ............... 455/422.1 |

FOREIGN PATENT DOCUMENTS

| EP | 1 612 996 A | 1/2006 |
| EP | 1 708 526 | 10/2006 |
| WO | WO 03/079209 A | 9/2003 |

OTHER PUBLICATIONS

Office Action dated Nov. 29, 2011 for corresponding Canadian Patent Application No. 2,639,958.

* cited by examiner

*Primary Examiner* — Wesley Kim
(74) *Attorney, Agent, or Firm* — Ridout & Maybee LLP

(57) ABSTRACT

A method, mobile communication device, and system for selective downloading to a mobile communication device are provided. In accordance with one embodiment, there is provided a method on a mobile communication device for downloading data from a content source to the mobile communication device, the mobile communication device being configured for connecting to at least cellular data networks and wireless local area networks (WLANs), the method comprising: receiving a request to download data; determining if the requested data comprises a media file; selecting a communication medium for downloading the requested data in accordance with whether the requested data comprises a media file; and downloading the requested data to the mobile communication device using the selected communication medium.

7 Claims, 7 Drawing Sheets

METHOD, MOBILE COMMUNICATION DEVICE, AND SYSTEM FOR SELECTIVE DOWNLOADING TO A MOBILE COMMUNICATION DEVICE

TECHNICAL FIELD

The present disclosure relates generally to communication systems and, more particularly to a method, mobile communication device, and system for selective downloading to a mobile communication device.

BACKGROUND

Wireless data networks for mobile devices such as mobile computers and mobile communication devices having data capabilities experience challenges relating to bandwidth bottlenecks due to the narrow bandwidth compared to "wired" data network connections, such as broadband Internet connections. The amount of data requested by users is increasing due to increased adoption of mobile data devices, due to users who are requesting more data, and due to users who are requesting increasingly richer forms of data, such as rich media types (including, for example, images, audio, video and multimedia) rather than plain text.

The high cost of cellular networks, currently the primary medium for wireless communications, means that users requesting large amounts of data and rich media will incur large data charges from their respective cellular carriers. This high cost dissuades many users from downloading large data files and from downloading rich media. The high cost also dissuades potential users from adopting new wireless technologies. Even with the application of state-of-the-art data compression and data optimization techniques, a high data overhead remains a challenge for meaningful data transmission to mobile data devices such as mobile handheld devices.

Another difficulty is that users may inadvertently or unknowingly transmit a large file, such as a media file, to their mobile devices. For example, some web pages may contain additional media features which are automatically downloaded to the mobile device, for example when a website is accessed. Users may wish to prevent such inadvertent transmissions or may wish to be given the choice regarding whether this additional content will be downloaded to the mobile device.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
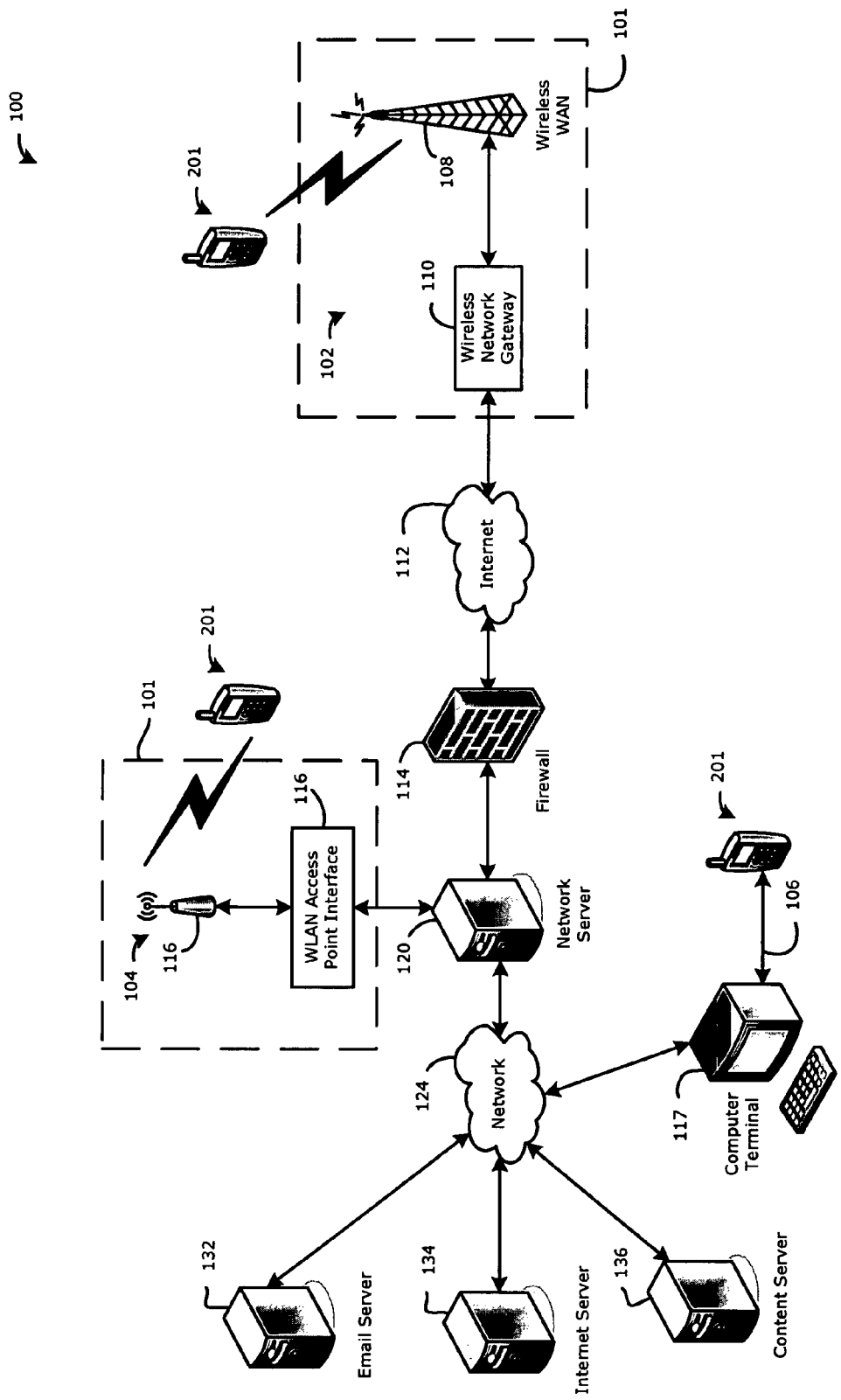
FIG. 1 is a block diagram illustrating a communication system including a mobile communication device to which example embodiments of the present disclosure can be applied.

The present disclosure describes a method, mobile communication device, and system for selective downloading to a mobile communication device. Information about data (such as media content) to be downloaded to a mobile communication device is obtained, and an appropriate communication delivery medium is selected based on one or both of whether the data is a media file and whether the data is of a size greater than or equal to a predetermined size threshold. The selected delivery medium may be a cellular data network (such as GSM, GPRS, EDGE, for example), a wireless local area (WLAN) network such as Wi-Fi™ network, a physical interface such as a USB port or other serial data port, or a short range wireless communication interface such as Bluetooth®. In some embodiments, if the selected delivery medium is not available, an alternate delivery medium is selected or the data is queued for future download when the selected delivery medium becomes available.

Conventional mobile communication devices typically offer little or no control over the data delivery medium to be used when downloading data, such as whether data should be downloaded using: (i) a cellular data network via a wireless WAN which is typically a low speed/high cost network; or (ii) a WLAN network such as Wi-Fi™ network, a physical interface such as via a serial data connection with a local computer having access to the requested data, or a short range wireless communication interface such as a Bluetooth® connection with a local computer having access to the requested data—which are typically higher speed and/or lower cost alternatives.

In one embodiment of the present disclosure, a mobile communication device determines the available communication medium(s), and a communication medium is selected from the available communication medium(s) in accordance with download rules which may be, for example, based on a "low cost" setting or a "high speed" setting. Determining the available communication medium(s) may comprise scanning for Wi-Fi™ or WLAN access points. The communication medium(s) may be selected in accordance with a priority list. In some embodiments, if one or more Wi-Fi™ or WLAN connections are available, the mobile communication device downloads all data using a Wi-Fi™ or WLAN connection selected from the available connections in accordance with a priority list.

If the selected communication medium is not available, the download be delayed and queued for future download when the selected communication medium becomes available, or an alternate communication medium may be selected, for example, from a priority list. For example, the requested data may be downloaded over a more expensive communication medium (such as a high cost cellular data network) if the user wishes "immediate" access to the requested data and the selected communication medium is not available.

In another embodiment of the present disclosure, a mobile communication device, in response to a request to download data, determines an indication of the size or type of the requested data. A communication medium for downloading the requested data is selected based on the determined size or size indication.

Determining the indication of size type of the requested data may comprise: (i) determining if the requested data comprises a media file; (ii) determining if the size of the requested data is greater than or equal to a predetermined threshold; (iii) determining if the requested data comprises a media file, and determining if the size of the requested data is greater than or equal to a predetermined threshold if the requested data comprises a media file; or (iv) the requested data comprises a file type which has been determined to be large or was requested from an application which has been determined to having large data files. Thus, in some embodiments the communication medium may be selected based on the size of the requested data without regard to whether the requested data comprises a media file.

The size of the requested data may be determined by requesting the size of the data from the content source where the requested data is located. The size may be obtained by requesting and receiving size information from a content server 136 where the requested data is located. The content server 136 may implement a proprietary solution for providing size information in respect to a download request from a communication device, such as a proprietary header or metadata solution for non-hypermedia and non-HTML (HyperText Markup Language) documents. The present disclosure is not concerned with how size information is determined and stored by content servers 136, but with the use of size information obtained from content servers 136 in response to a request for such information. Accordingly, solutions for determining and storing size information in association with content (such as media data) maintained by a content server 136 are not described herein. However, such solutions would appreciated by persons ordinarily skilled in the art.

Alternatively, the size of the requested data may be determined by requesting, receiving and analysing a header or header data concerning a hypermedia document such as an HTML document from the content server 136 or Web server 134 where the requested data is located. Headers of an HTML document may be obtained via a HTTP HEAD request. Header data often comprises metadata which includes information about the media content including the size of the hypermedia document.

An indication of size (or type) of the requested data be determined by determining if the requested data comprises a media file. Media files are typically large relative to non-media files and so this may be a relative indication that the requested data is large in size. Where a check is performed to determining if the requested data comprises a media file, if the requested data is determined to comprise a media file, it is determined to be "large" and a suitable communication medium for large data files (such as Wi-Fi™) is selected and used for downloading the requested data. If the requested data is determined not to comprise a media file, it is not determined to be large and may be downloaded using any communication medium (such as a cellular data network).

Where the size of the requested data is determined, if it is greater than or equal to a predetermined threshold, it is determined to be "large" and a suitable communication medium for large data files is selected (such as Wi-Fi™) and used for downloading the requested data. If the size of the requested data is less than the predetermined threshold, it is not determined to be large and may be downloaded using any communication medium (such as a cellular data network).

The communication medium may be selected in accordance with a "low cost" setting or "high speed" setting. The user setting may be stored in memory on the mobile communication device or the user may be prompted when they attempt to download data, for example, if they attempt to download data that is determined to comprise a media file and/or determined to be relatively large.

If the selected communication medium is not available, the download be delayed and queued for future download when the selected communication medium becomes available, or an alternate communication medium may be selected, for example, from a priority list. For example, the requested data may be downloaded over a more expensive communication medium (such as a high cost cellular data network) if the user wishes "immediate" access to the requested data and the selected communication medium is not available.

Reference is first made to FIG. 1 which shows in block diagram form a communication system 100 in which example embodiments of the present disclosure can be applied. The communication system 100 comprises a number of mobile communication devices 201 (FIG. 2) connected to a wireless network 101. The wireless network 101 comprises one or more of a wireless Wide Area Network (WAN) 102 and a Wireless Local Area Network (WLAN) 104. In some embodiments, the mobile communication device 201 is configured to communicate over both the wireless WAN 102 and WLAN 104, and to roam between these networks.

The communication system 100 also comprises a wireless network gateway 110 with connects the mobile communication devices 201 to the Internet 112, and through the Internet 112 to a network provider system comprising a network server 120 such as an enterprise server. The wireless network gateway 110 provides translation and routing services between the network server 120 and the WAN 102, which facilitates communication between the mobile communication devices 201 and other devices (not shown) connected, directly or indirectly, to the wireless network 101. Accordingly, communications sent via the mobile communication devices 201 are transported via the wireless network 101 to the wireless network gateway 110. The wireless gateway 110 forwards the communications to the network server 120 via the Internet. Communications sent from the network server 120 are received by the wireless network gateway 110 and transported via the wireless network 101 to the mobile communication devices 201.

The wireless WAN 102 may be implemented as a packet-based cellular network that includes a number of transceiver base stations 108 (one of which is shown in FIG. 1) where each of the base stations 108 provides wireless Radio Frequency (RF) coverage to a corresponding area or cell. The wireless WAN 102 is typically operated by a cellular network service provider that provides subscription packages to users of the mobile communication devices 201. In some embodiments, the wireless WAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) or various other third generation networks such as EDGE (Enhanced Data rates for GSM Evolution) or UMTS (Universal Mobile Telecommunication Systems), or various other 3.5G networks such as HSPDA (High-Speed Downlink Packet Access) or 4G networks.

The WLAN 104 comprises a wireless network which, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments. The WLAN 104 includes one or more wireless RF Access Points (AP) 114 (one of which is shown in FIG. 1) that collectively provide a WLAN coverage area.

The WLAN 104 is typically operated by an enterprise (for example, a business or university) and the access points 114 are connected to an access point (AP) interface 116. The AP interface 116 provides translation and routing services between the access points 114 and the network server 120 to facilitate communication between two or more of the mobile communication devices 201 and other devices connected, directly or indirectly, to the network server 120. The AP interface 116 is implemented using a computer, for example, a server running a suitable computer program or software.

It will be appreciated that the wireless WAN 102 and WLAN 104 may have coverage areas that overlap, at least partially. Typically, the coverage area of the wireless WAN 102 will be much larger than the coverage area of the WLAN 104 and may overlap all or a large percentage of the coverage area of the WLAN 104. The WLAN 104 may have sole coverage in some regions that are dead spots in the wireless WAN 102. For example, some interior locations of an enterprise's buildings may be impenetrable to signals transmitted by the WAN 102. Typically, the channel resources, such as bandwidth available for providing content to the mobile communication devices 201 will be greater over the WLAN 104 than over the wireless WAN 102.

The network server 120 may be implemented as one or more server modules, and is typically located behind a firewall 114. The network server 120 provides the mobile communication devices 201 with access to the network provider or enterprise's internal network 124 such as an enterprise network. The network server 120 provides administrative control and management capabilities over users and mobile communication devices 201 which may connect to the network 124. The network server 120 is dedicated to managing communications to and from a set of managed mobile communication devices 201 such that the mobile communication devices 201 are each enabled to exchange electronic messages and other information with the network 124.

The network server 120 allows the managed mobile communication devices 201 to access resources of the network 124, such as an email server 132 (for example, a Microsoft Exchange™, IBM Lotus Domino™, or Novell GroupWise™ email server) for connecting to an enterprise email system, an Internet/Web server 134 for connecting to the Internet 112 and World Wide Web (WWW), and one or more application servers or content servers 136 for implementing enterprise applications or for accessing other servers such as an instant messaging (IM) server for connecting to an Instant messaging system. One or both of the Internet/Web server 134 or application/content server 136 may, in some operational modes, operate as proxy servers for obtaining content from a remote content source or content server 136 where the content is stored (sometime referred to as an origin server). The network server 120 is configured to direct or redirect email messages, Personal Information Management (PIM), instant messaging (IM) and other data received from the wireless network 101 and internally within the network 124 to be addressed to the mobile communication devices 201.

The network server 120 also provides secure transmission of email, PIM, IM and other enterprise data transmitted from the network server 120 to managed mobile communication devices 201. In some embodiments, communications between the network server 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. The private encryption key is stored only in the user's mailbox on the email server 132 and on the mobile communication device 201, and can typically be regenerated by the user on mobile communication devices 201. Data sent to the mobile communication devices 201 is encrypted by the network server 120 using the private encryption key retrieved from the user's mailbox. The encrypted data, when received on the mobile communication devices 201, is decrypted using the private encryption key stored in memory. Similarly, data sent to the network server 120 from the mobile communication devices 201 is encrypted using the private encryption key stored in the memory of the mobile communication device 201. The encrypted data, when received on the network server 120, is decrypted using the private encryption key retrieved from the user's mailbox.

In some embodiments, the network server 120 comprises a mobile data delivery module (not shown) which provides connectivity between the wireless WAN 102 and the WLAN 104 and the other connections 106 and mobile communication devices 201 and/or networks connected directly or indirectly to the network server 120. Alternatively, the mobile data delivery module (not shown) may be implemented by a separate server or server application which is connected to the network server 120. In some embodiments, the mobile data delivery module (not shown) provides TCP/IP (transmission control protocol/Internet protocol) and HTTP (hypertext transfer protocol)-based connectivity providing an Internet based service connection. The mobile data delivery module provides access for the mobile communication devices 102 to the Internet 112 and World Wide Web (WWW) and possibly other external communication networks.

In some embodiments, the network server 120 is configured to enforce IT (information technology) policies on the mobile communication devices 201. IT policies are rules which govern the functionality of the mobile communication devices 201. The network server 120 may periodically transmit IT policy messages to enforce, modify, or terminate IT policies on the connected computing devices. The network server 120 transmits the IT policy messages through the wireless network 101 to its managed mobile communication devices 201 or via the physical interface (e.g., serial data port 252 such as a USB port) or short-range wireless communication interface (e.g., Bluetooth® connection) 106 when connected to the user's computer terminal 117. The IT policy messages may be security policies (such as data protection security policies), information and/or security settings regarding these policies, and/or commands to be executed by the mobile communication devices 201. The IT policies can be set by an IT administrator of the network 124 by sending an appropriate IT policy message to the mobile communication devices 201 managed by the network server 120. The periodic transmission of IT policy messages from the network server 120 the managed mobile communication devices 201 assists in ensuring, among other things, that each of the mobile communication devices 201 is kept up to date with the latest IT policy. The content and frequency of IT policy messages may be set by the IT administrator. In at least some embodiments, the network server 120 generates a private and public key pair for each mobile communication device 201 to authenticate the IT policy messages. The IT policy private key is stored in the network server 120. The IT policy public key is stored on the mobile communication device 201. The network server 120 digitally signs all IT policy messages using the IT policy public key which uses the IT policy public key to authenticate the digital signature in received IT policy messages. The IT policy messages 274 and/or rules contained within the IT policy messages may be stored in the memory (e.g., flash memory 244) of the mobile communication device 201.

In some embodiments, the mobile data delivery module optimizes data requested by the mobile communication devices in accordance with the runtime environment and/or technical capabilities of the mobile communication device 201 which requested the data. For example, where the requested data is a Hypertext Markup Language (HTML) document, the mobile data delivery module generates an optimized HTML document in accordance with the runtime environment and/or technical capabilities of the mobile communication device 201, and transmits the optimized HTML document to the mobile communication device 201.

The wireless network gateway 110 is adapted to route data packets received from the mobile communication device 201 over the wireless network 101 to destination email and/or Instant messaging server 132, Internet/Web servers 134, and one or more application servers 134 through the mobile data delivery module, and to route data packets received from the servers 132, 134, 136 through the mobile data delivery module over the wireless network 101 to a destination mobile communication device 201. The wireless network gateway 110 forms a connection or bridge between the servers 132, 134, 136 and wireless networks associated with wireless e-mail communication and/or Internet access.

The network 124 may comprise a private local area network, wide area network, or combinations thereof. Typically, the network 124 is an intranet of a corporation or other organization. The network server 120 may also provide access to other public or private communication networks such as the Internet 112. Computer terminals 117 (one of which is shown in FIG. 1) such as desktop or notebook computers are also connected to the network 124. A user associated with a particular mobile communication device 201 typically has a computer terminal 117 designated for his or her use that is connected to the network 124 by a wired connection or through a WLAN access point interface 116. Alternatively, in some embodiments, if the mobile communication device 201 is a mobile computer such as a notebook computer that may connect directly to the network 124 using a wired connection or through a WLAN access point interface 116.

The communication system 100 also comprises one or both of a physical interface and short-range wireless communication interface 106 for exchanging information between the network server 120 and the mobile communication device 201 via the computer terminal 117. The physical interface comprises one or combinations of an Ethernet connection, Universal Serial Bus (USB) connection, Firewire™ (also known as an IEEE 1394 interface) connection, or other serial data connection. In some embodiments where the mobile communication device 201 is a handheld device such as a smart phone or PDA, the physical interface 106 may be a connection between respective ports or interfaces of the mobile communication device 201 a computer terminal 117 such as the user's desktop or laptop computer which is connected to the network server 120 by a wired connection or through WLAN access point interface 116. The short-range wireless communication interface comprises one or a combination of an infrared (IR) or short-range radio frequency (RF) communication such as Bluetooth® or other wireless personal area network (PAN) interface which allows the mobile communication device 201 to exchange information with the computer terminal 117, and the network server 120 via the computer terminal 117.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

Figure 2:
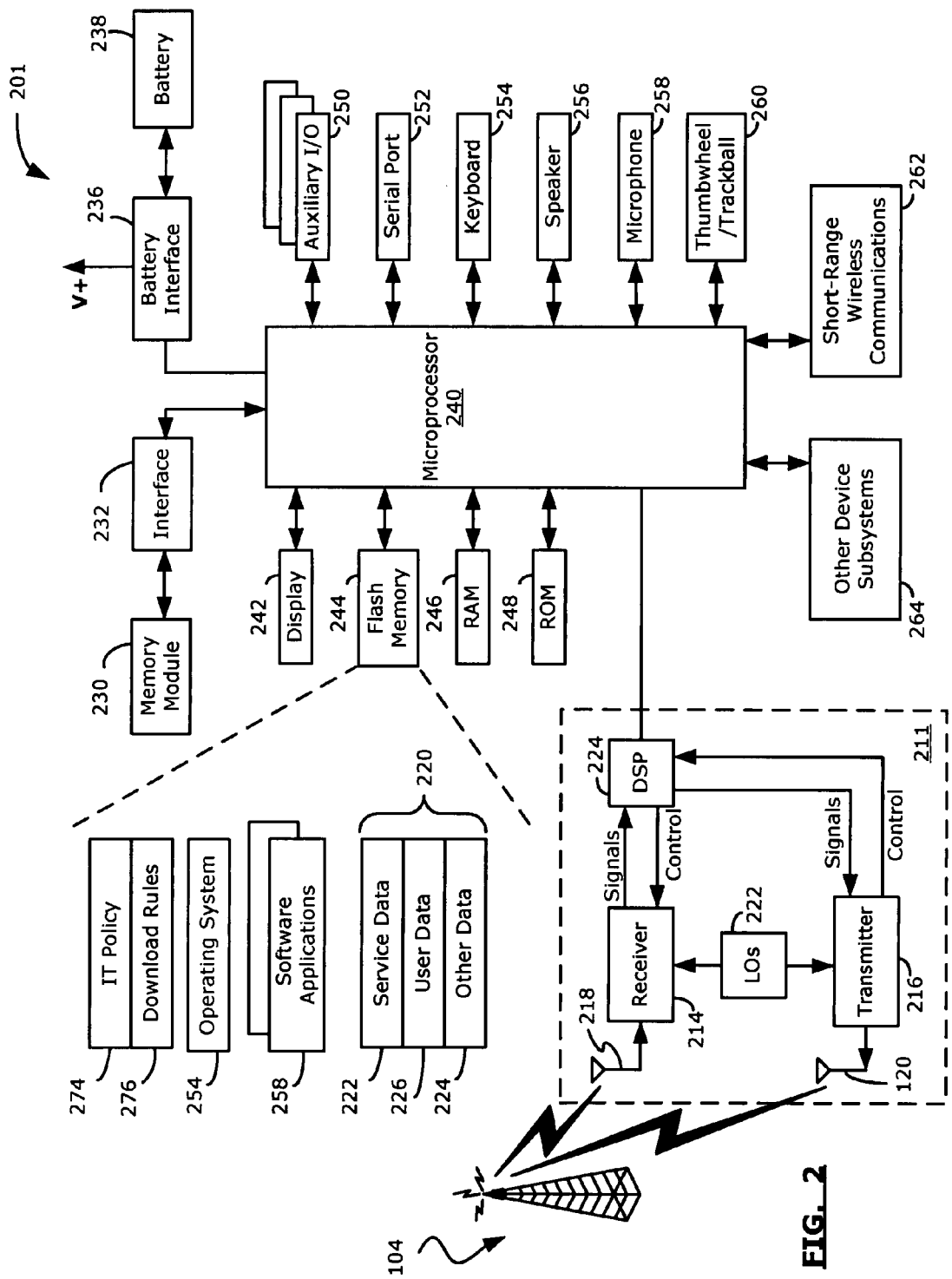
FIG. 2 is a block diagram illustrating a mobile communication device in which example embodiments of the present disclosure can be applied.

Reference is next made to FIG. 2 which illustrates in block diagram form a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a mobile telephone, a PDA (personal digital assistant) enabled for wireless communication, or a computer system with a wireless modem.

The mobile communication device 201 includes a wireless communication subsystem 211 for exchanging radio frequency signals with the wireless network 101. The wireless communication subsystem 211 comprises at least a WAN communication subsystem for two-way communication with the wireless WAN 102 and a WLAN communication subsystem two-way communication with the WLAN 104 via the access points 116. The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201. As will be apparent to those skilled in the field of communication, the particular design of the communication subsystem 221 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but also provides for receiver and transmitter control. For example, the gains applied to communication signals in the receiver 214 and the transmitter 216 may be adaptively controlled through automatic gain control algorithms implemented in the DSP 224.

The mobile communication device 201 includes a microprocessor 240 which controls the overall operation of the mobile communication device 201. The microprocessor 240 interacts with communication subsystem 211 which performs communication functions. The microprocessor 240 also interacts with additional device subsystems such as a display 242 which may be a backlight light emitting diode (LED) screen or liquid crystal display (LCD) screen, a flash memory 244, a random access memory (RAM) 246, a read only memory (ROM) 248, auxiliary input/output (I/O) subsystems 250, a data port 252 such as serial data port (for example, a Universal Serial Bus (USB) data port), a keyboard or keypad 254, a speaker 256, microphone 258, a clickable thumbwheel (trackwheel) or trackball 260, a short-range communication subsystem 262, and other device subsystems generally designated as 264.

The microprocessor 240 operates under stored program control and executes computer programs or code modules stored in memory such as persistent memory such as the flash memory 244. The computer programs or code modules comprise two general categories of software: operating system software 254 and software applications 258. Those skilled in the art will appreciate that the operating system 254, specific device applications 258, or parts thereof, may be temporarily loaded into volatile memory such as the RAM 246. The RAM 246 is used for storing runtime data variables and other types of data or information, as will be apparent to those skilled in the art.

The software applications 258 may include a range of applications, including, for example, an address book application, a messaging application, a calendar application, and/or a notepad application. In some embodiments, the software applications 258 include a Web browser (i.e., for a Web-enabled mobile communication device 200), an email message application, a push content viewing application, and/or a voice communication (i.e. telephony) module. Each of the software applications 258 may include layout information defining the placement of particular fields and graphic elements (e.g. text fields, input fields, icons, etc.) in the user interface (i.e. the display 242) according to the application.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a satellite network (not shown).

Some of the subsystems shown in FIG. 2 perform communication-related functions, whereas other subsystems may provide "resident" or on-device functions. Notably, some subsystems, such as the keypad 254, the display 242, and the clickable thumbwheel/trackball 260, for example, may be used for both communication-related functions, such as entering a text message for transmission over the wireless network 101, and executing device-resident functions such as a calculator or task list.

In some embodiments, the mobile communication device 201 also includes a removable memory card 230 (typical comprising flash memory) and a memory card interface 232. Network access to the WAN 102, and possibly the WLAN 104, is typically associated with a subscriber or user of the mobile communication device 201 via the memory card 230, which may be a Subscriber Identity Module (SIM) card for use in a GSM network or other type of memory card for use in the relevant wireless network type. The memory card 130 is inserted in or connected to the memory card interface 232 of the mobile communication device 201 in order to operate in conjunction with the wireless network 101.

The mobile communication device 201 stores data 220 in an erasable persistent memory, which in one example embodiment is the flash memory 244. In various embodiments, the data 220 includes service data 222 comprising information required by the mobile communication device 201 to establish and maintain communication with the wireless communication network 200 (wireless network service data) and the wireless gateway 210 (gateway service data). The data 220 may also include other data 224, user application data 226 such as email messages, address book and contact information, calendar and schedule information, notepad documents, image files, and other commonly stored user information stored on the mobile communication device 201 by its user. The data 220 may also include data required for the communication layers managed by the network server 120 and servers 132, 134, 136. The data 220 may includes critical data that the user of mobile communication device 201 or the user's associated enterprise does not want to be accessed by an unauthorized party. Some of the data 220 may be stored on the memory card 230. The data 220 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used in a PDA-type communication device for synchronization with a user's computer terminal 117. The serial data port 252 is a Universal Serial Bus (USB) port in some embodiments. The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through the serial data (i.e., USB) or Bluetooth® connection to the computer terminal 117 using standard connectivity protocols. When a user connects their mobile communication device 201 to the computer terminal 117 via a USB cable, the network server 120 will automatically route traffic that was destined for the wireless network 101 to the mobile communication device 201 over the internal network 124 using the USB cable connected to the mobile communication device 201. Similarly, any traffic destined for the wireless network 101 will be automatically sent over the USB cable to the network server 120 for processing. This is sometimes referred to as least-cost routing. In some embodiments, the user has the ability to automatically route traffic over a Bluetooth® connection to their computer rather than relying on USB connectivity. All traffic to and from the mobile communication device 201 is routed over the internal network 124 (which may be, for example, a wired network), saving the user from utilizing additional bandwidth from their wireless service provider. When least-cost routing is used on the mobile communication device 201, it is performed automatically by the low-level protocol layers and does not require any changes to an application for it to utilize this capability.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 262 is an additional optional component which provides for communication between the mobile communication device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

A predetermined set of applications that control basic device operations, including data and possibly voice communication applications will normally be installed on the mobile communication device 201 during or after manufacture. Additional applications and/or upgrades to the operating system 254 or software applications 258 may also be loaded onto the mobile communication device 201 through the wireless network 101, the auxiliary I/O subsystem 250, the serial port 252, the short-range communication subsystem 262, or other suitable subsystem 264 other wireless communication interfaces. The downloaded programs or code modules may be permanently installed, for example, written into the program memory (i.e. the flash memory 244), or written into and executed from the RAM 246 for execution by the microprocessor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may include a personal information manager (PIM) application having the ability to organize and manage data items relating to a user such as, but not limited to, instant messaging, email, calendar events, voice mails, appointments, and task items. The PIM application has the ability to send and receive data items via the wireless network 101. In some example embodiments, PIM data items are seamlessly combined, synchronized, and updated via the wireless network 101, with the user's corresponding data items stored and/or associated with the user's computer terminal 117, thereby creating a mirrored host computer on the mobile communication device 201 with respect to these data items.

The mobile communication device 201 provides two principal modes of communication: a data communication mode and a voice communication mode. In the data communication mode, a received data signal such as a text message, an email message, or Web page download will be processed by the communication subsystem 211 and input to the microprocessor 240 for further processing. For example, a downloaded Web page may be further processed by a browser application or an email message may be processed by an email message application and output to the display 242. A user of the mobile communication device 201 may also compose data items, such as email messages, for example, using the keypad 254 and/or the clickable thumbwheel or trackball 260 in conjunction with the display 242 and possibly the auxiliary I/O device 250. The keypad 254 maybe either a complete alphanumeric keypad or telephone-type keypad. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and the keyboard or keypad 254). Alternative voice or audio I/O subsystems, such as a voice message recording subsystem, may also be implemented on the mobile communication device 201. Although voice or audio signal output is typically accomplished primarily through the speaker 256, the display 242 may also be used to provide an indication of the identity of a calling party, duration of a voice call, or other voice call related information.

It will be appreciated that the mobile communication device 201 may be configured to communicate with a content store (such as the Internet/Web server 134 or content server 136) via the network server 120 through different communication mediums comprising: (i) the wireless WAN 102 when within the coverage area of a transceiver base station 108; (ii) the WLAN 104 when within the respective coverage area of a WLAN access point 116; (iii) a physical or short-range wireless communication interface 106 when connected to the network server 120 via a wired interface or within the coverage area of the short-range wireless communication interface 106 such Bluetooth® or other wireless PAN.

Figure 3:
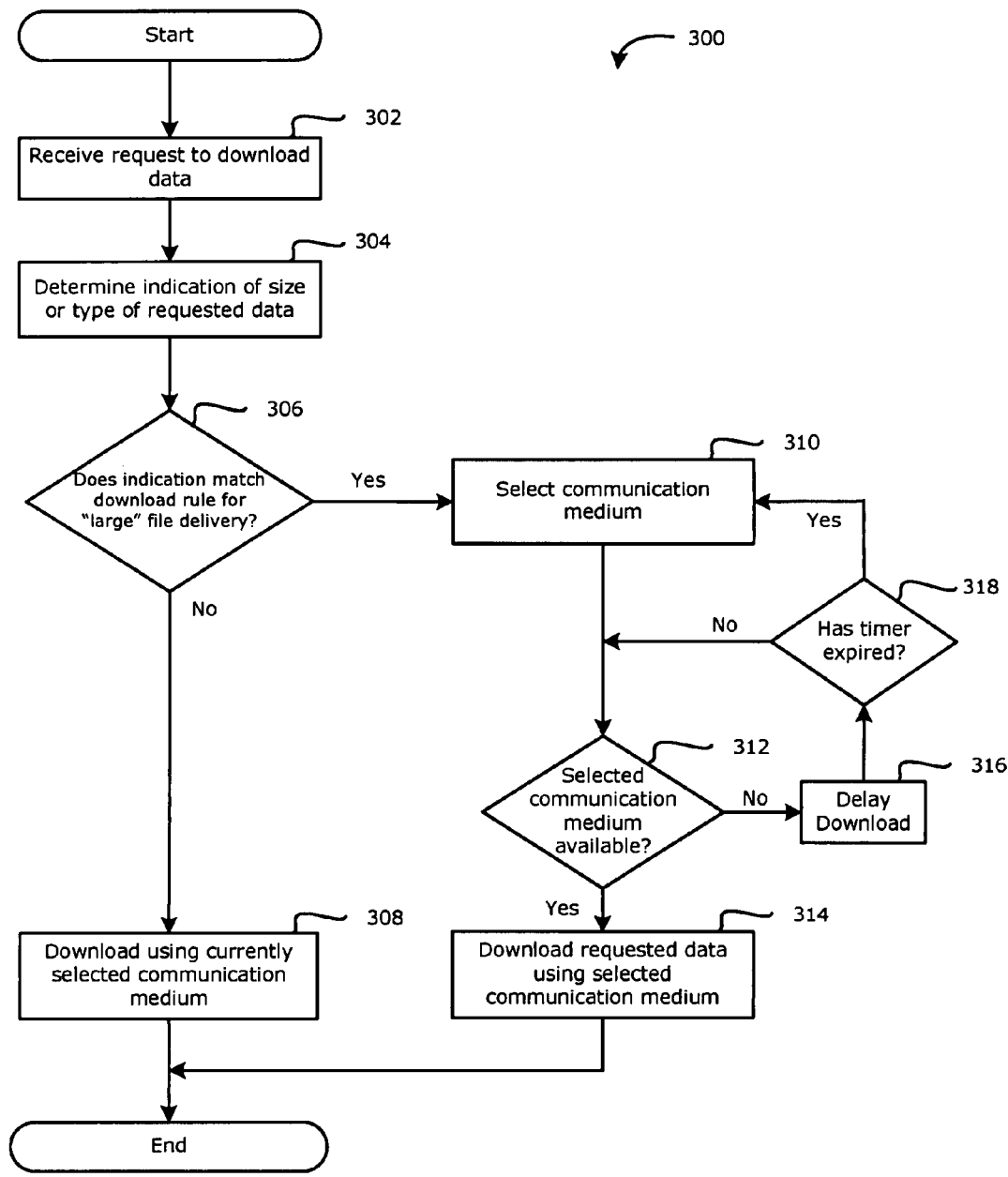
FIG. 3 is a flowchart illustrating a process for selecting a communication medium for downloading data in accordance with one example embodiment of the present disclosure.

Reference is now made to FIG. 3 which illustrates operations 300 for selecting a communication medium for downloading data (e.g., media content) from a content source (such as a content server 136 or remote media content store) to the mobile communication device 201 in accordance with one embodiment of the present disclosure. In this example embodiment, the operations 300 are executed by the processor of a mobile communication device 201. The operations 300 may be executed by a Web browser or other application 258 on the mobile communication device 201 which accesses remote data such as media viewer or player applications, particularly streaming media applications. As described above, the mobile communication device 201 is configured for connecting to a network server 120 via a cellular data network and one or more alternate communication mediums such as Wi-Fi™, Bluetooth® or serial data bypass. The network server 120 accesses the content source via the Internet 112 or other communication network. In the first step 302, a request to download data to the mobile communication device 201 is received from a user via respective user input on the mobile communication device 201.

Next, in step 304 an indication of the size (or type) of the requested data is determined. The step 304 may be implemented in different ways, as will be explained in more detail below. Determining the indication of size may comprise: (i) determining if the requested data comprises a media file; (ii) determining if the size of the requested data is greater than or equal to a predetermined threshold; or (iii) determining if the requested data comprises a media file, and determining if the size of the requested data is greater than or equal to a predetermined threshold if the requested data comprises a media file.

It will be appreciated that determining the size of the requested data without any consideration for the type of data may result in increased processing associated with performing this step for all data requests. Determining if the requested data comprises a media file without any consideration of the size of the data may result in small data files which are not problematic to be "filtered" or processed differently.

Determining if the requested data comprises a media file which should be subject to selective downloading for "large" file delivery may be determined in different ways, as will be explained in more detail below in the context of operations 400 and 500. In some embodiments, determining if the requested data comprises a media file comprises determining if the requested data is of a predetermined file type (e.g., a file having a certain file extension) or determining if the request originated from one of a predetermined list of applications which have been classified as media applications.

In other embodiments, determining the indication of size in step 304 may comprise determining whether the requested data comprises a file of predetermined type which has been determined to be large for the purposes of the download operations 300 and been classified as such within memory, for example, within the download preferences. This comprises comparing the file type of the requested data from the download request (step 302) against a list of one or more predetermined file types (such as media files, PDF documents, hypermedia documents, word processing documents, and/or other rich media files) which have been classified as large, and if the file type of the requested data is within the list of predetermined file types, the requested data is determined to be a large.

In other embodiments, determining the indication of size in step 304 may comprise determining the application 258 on the mobile communication device 201 from which the download request (step 302) originated, comparing it against a predetermined list of applications determined to utilize large data files and been classified as such within memory. If the application is within the predetermined list of applications which have been classified utilizing large data files, the requested data is determined to be a large. The predetermined list of applications comprises a list of local applications on the mobile communication device 201 and is stored in memory, for example, within the download preferences.

Next, in step 306 it is determined whether the indication matches a download rule 276 for "large file" delivery. If the indication matches a download rule for "large file" delivery, the operations 300 proceed to step 310 where a communication medium for large data files (such as Wi-Fi™) is selected. If the indication does not match a download rule for "large file" delivery, the operations 300 proceed to step 308 where the requested data is downloaded using any communication medium (such as a cellular data network).

Depending of the embodiment and the indication determined in step 304, the indication matches download rule for "large file" delivery: (i) if the requested data comprises a media file; (ii) the size of the requested data is greater than or equal to the predetermined threshold; (iii) if the requested data comprises a media file and the size is greater than or equal to the predetermined threshold; or (iv) the requested data comprises a file type which has been determined to be large or was requested from an application which has been determined to having large data files. Conversely, in these embodiment the indication does not match download rule for "large file" delivery: (i) if the requested data does not comprises a media file; (ii) if the size of the requested data is less than the predetermined threshold; (iii) if the requested data comprises a media file and the size is less than the predetermined threshold; or (iv) the requested data does not comprises a file type which has been determined to be large and was not requested from an application which has been determined to having large data files.

Next, in step 308 the requested data is downloaded to the mobile communication device 201 using any communication medium (typically the active communication medium), which may be the cellular data network of the wireless WAN 102 and the operations 400 end. The communication medium may be set or determined in accordance with a download setting or download rule 276. Other delivery mediums for "small" files may also be used. For example, if the mobile communication device 201 has cellular data and Wi-Fi™ connectivity, and the mobile communication device 201 is in Wi-Fi™ mode, Wi-Fi™ may be used to download the requested data. In some embodiments, the download rules 276 may specify that a cellular data network can only be used if the requested data is determined not to be "large" (i.e., if it does not comprise a media file and/or the requested data has a size less than the predetermined size threshold).

Next, in step 310 a communication medium for large data files is selected. The selection may be in accordance with a download rule 276. The communication medium may be selected from one or a combination of: a WLAN connection such as Wi-Fi™, a serial data connection such as a USB connection, and a short-range wireless communication connection such as Bluetooth®. The communication medium may also be selection from or one or more wireless WAN connection such as a cellular data network (for example).

The download rules 276 may specify a predetermined communication medium to use (such as Wi-Fi™) or a "priority" list of communication mediums for use in selecting a communication medium. The priority list may list communication mediums in a descending order of priority. For example, the priority list may comprise one or more of: one or more preferred cellular data networks (preferred for cost and/or speed); one or more WLAN (Wi-Fi™) connections, one or more short-range wireless communication connection such as Bluetooth®, and one or more serial data connection. A download setting may be associated with a corresponding download rule 276. Depending on the download setting, the communication mediums or priority list may be selected to lower data charges (i.e., the low cost setting), to lower download times (i.e., the high speed setting), or to optimize download cost and speeds (i.e., the optimize setting). While higher speeds are often associated with higher data charges, this is not always the case. For example, EVDO-A may be a relatively fast cellular data network and may have relatively high associated data charges, whereas some Wi-Fi™ access points or "hot spots" are faster and may be free of charge. Similarly, a serial bypass connection is faster and free of wireless data charges.

The selected communication medium may be selected from multiple cellular data networks, multiple WLANs (Wi-Fi™ networks), one or more short-range wireless communication connection such as Bluetooth®, and one or more serial data connections. In some implementations, Wi-Fi™ networks may be deemed to free, whereas other implementations may have awareness of whether a particular Wi-Fi™ network has an associated charge. Even when a Wi-Fi™ network is tariffed, it is typically much cheaper than a cellular data network. Bluetooth® and serial data connections have no associated data charges and so are free. In the majority of use case scenarios, media and/or large files are to be downloaded over Wi-Fi™ whereas no larger files such as media files may be downloaded using a cellular data network. In these use case scenarios, cellular data networks are to be used for downloading only small files.

The download rules 276 are typically stored in memory of the mobile communication device 201, typically as part of download preferences stored in memory, for example in the flash memory 244. In some embodiments, the download preferences (such as the download settings and download rules 276) may be set by the user or via an IT policy rule by the IT system administrator which is pushed out to the managed mobile communication device 201 using IT policy messages 274. An example user interface 600 for setting download preferences is described below with reference to FIG. 6.

Next, in step 312 the mobile communication device 201 determines if the selected communication medium is available. If the selected communication medium is available, then operations 300 proceed to step 314 where the requested data is downloaded using the selected communication medium. For example, selected communication medium may be Wi-Fi™ and the mobile communication device 201 may be within the coverage of a WLAN access points 116 (or may be connected to the computer terminal 117 via the serial data port 252, for example using USB connectivity, or via a short-range wireless communication interface, for example, using Bluetooth® if either of these were the selected communication medium).

It will be appreciated that downloading the requested data using the selected communication medium may require, as a preliminary step, a network connection to be established in some instances, for example, if the selected communication medium is Wi-Fi™ but the mobile communication device 201 is not currently connected to the corresponding WLAN 104, the required network connection must be established by the mobile communication device 201. This may involve providing user name (login ID) and password information, and possibly other credentials, which may include payment information (if the WLAN 104 is not free). Login information may be retained after the first login for a period of time, for example for the calendar day, eliminating the need for a user to re-enter this information during the retention period.

In some embodiments, if the indication matches a rule for "large" file delivery (step 306), the user of the mobile communication device 201 may be notified that they are attempting to download data which has been determined to be "large", and may be given the option of downloading the requested data using any active communication medium, for example, to obtain immediate access to the requested data. This may be, for example, because the user is not concerned with data charges and/or the selected communication medium for "large" file delivery is not available. Downloading of the requested data may be delayed for a predetermined amount of time, for example, for 5-10 seconds while a notification and prompt for a bypass action are presented to the user. The bypass action may comprise selecting a corresponding command button in a dialog box presented on the display screen 242. A countdown timer for the predetermined amount of time may be presented on the display screen 242. The requested data may be downloaded using the cellular data network (or other active communication medium) if user input to use the cellular data network (or other active communication medium) is received before the expiry of the predetermined amount of time.

If the user provides input via the user input device(s) of the mobile communication device 201 that immediate access is desired, the operations 300 proceed to step 308 where the requested data is downloaded to the mobile communication device 201 using any active communication medium, which may be a high cost cellular data network of the wireless WAN 102. This effectively bypasses the download rules 276. If the user does not provide input that immediate access is, the operations 300 proceed to step 310 where a communication medium is selected.

If the selected communication medium is not available, the operations 300 proceed to step 316 where the download is delayed until it becomes available. The communication medium may not be available because, for example, the mobile communication device 201 is not within the coverage of the WLAN 104 (or is not connected to the computer terminal 117 via the serial data port 252 or short-range wireless communication interface). In some embodiments, a continual check is performed at predetermined intervals of time until the selected communication medium becomes available, for example on a minute-by-minute or hourly basis. In other embodiments, an alert will be issued (for example using an interrupt or other command) from the communication subsystem 211 when the communication medium becomes available. In response to the alert, the mobile communication device 201 begins download using the communication medium.

In some embodiments, a countdown timer is initiated which delays the download for a predetermined amount of time as shown (step 318). If the predetermined amount of time has not expired, the delay continues as described above. After the expiry of the predetermined amount of time, the operations 300 loop back to step 310 where an alternate communication medium is selected (for example, the next communication medium in a priority list may be selected) for downloading the requested data. This step may be repeated for each communication medium in the priority list. In some embodiments, if none of the communication mediums in the priority list are available, the user may be notified and/or prompted to determine if immediate access to the requested stat is desired, in which case, any active communication medium may be selected using user input to this effect. Alternatively, if none of the communication mediums in the priority list are available, the download may be cancelled. Alternatively, no delay may be performed (for example, based on user settings) and the requested data is not downloaded if the selected communication medium is not available at the time the request is made. In this case, a notification is presented to the user of the mobile communication device 201.

Preferences regarding the above-noted alternatives may be stored in the download preferences stored in the memory of the mobile communication device 201, for example, the flash memory 244.

It will be appreciated that the exact order of steps in the operations 300 may vary and that some steps may not be required in some example embodiments. It will also be appreciated that if the requested data comprises one or more data files, which may be embedded or linked data files within a Hypertext Markup Language (HTML) document (e.g. Web page) or other hypermedia document, the operations 300 may be performed for each data file in the requested data.

In terms of relative cost and bandwidth, communication over the wireless WAN 102 typically has the highest cost and lowest bandwidth compared with Wi-Fi™, Bluetooth® and serial bypass. Communication over the wireless LAN 104 (Wi-Fi™) is typically less costly and provides more bandwidth relative to the WAN 102. Communication over Bluetooth® or serial bypass typically has the lowest cost and greatest bandwidth, and in some cases may have no cost in terms of an associated data transmission charge.

Example Use Case Scenario

An example use case scenario will now be described for the purpose of illustration only. The mobile communication device 201 has cellular data network and Wi-Fi™ connectivity. A user accesses an online music store via a Web browser or standalone application using the mobile communication device 201. The user may access the online music store using either a cellular data network or Wi-Fi™. The active download rules specify that any download request for media files which are greater than 100 kB in size should use Wi-Fi™, whereas smaller files may be downloaded using the cellular data network or Wi-Fi™ (whichever is available, if both are available then Wi-Fi™).

The user may browse albums, songs, prices, and other information about media for sale in the online music store. After making a selection for downloading, for example after purchasing an album for download, the mobile communication device 201 determines that the download request includes audio files and which are greater than 100 kB and so are large in size. Downloading the album will be costly using a cellular data network. In accordance with the operations 300, the songs in the album match the download rule for selective downloading using "large" file delivery—which in this example means Wi-Fi™. Accordingly, the songs must be downloaded using Wi-Fi™. However, the mobile communication device 201 may not be in the range of a Wi-Fi™ access point or "hot spot" and so the download may need to be delayed until the mobile communication device 201 is in range. However, the album or cover art and/or track information may be less than 100 kB and so may be downloaded using a cellular data network.

An Example Method for Determining if Requested Data Comprises Media Files

Figure 4:
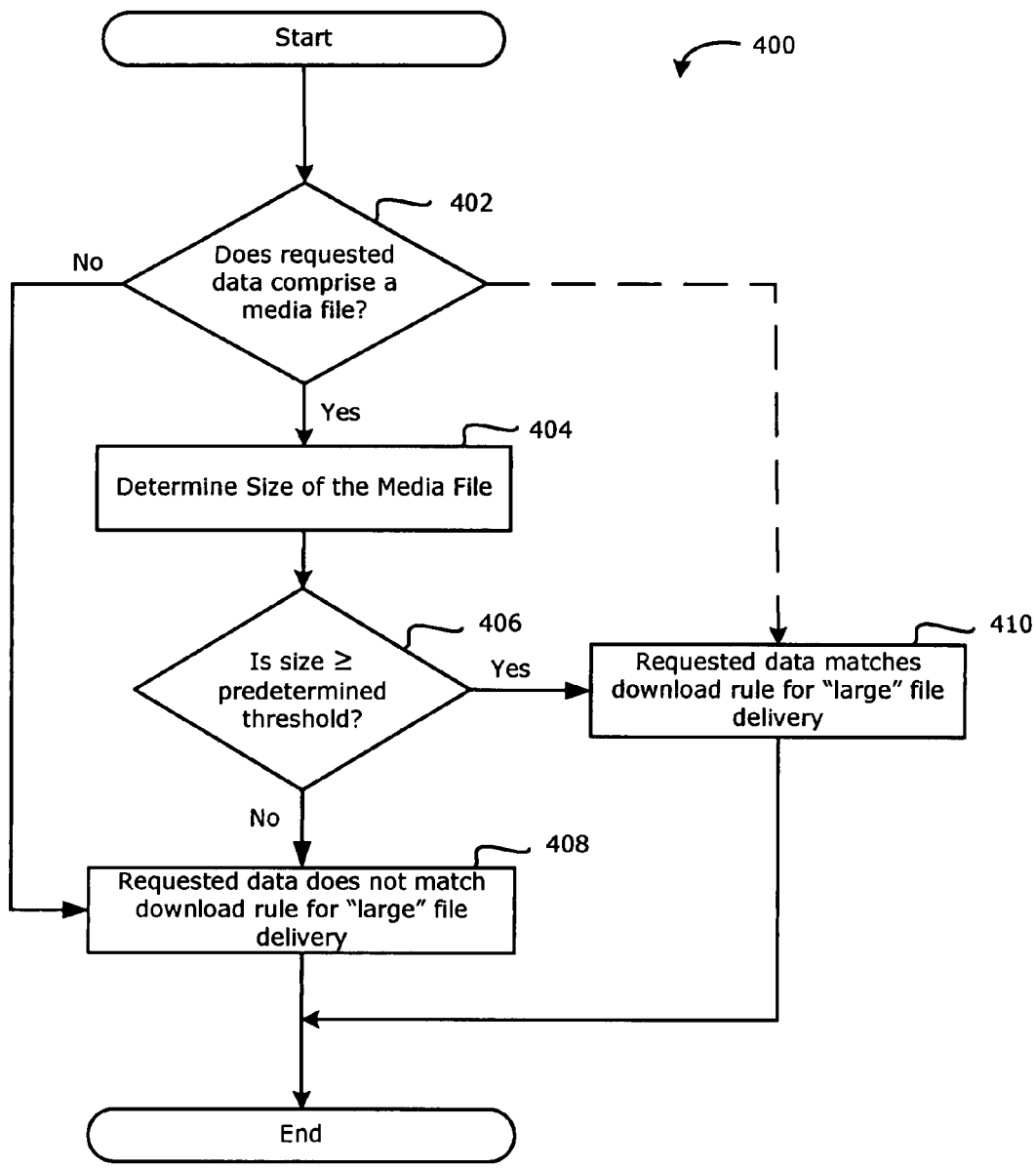
FIG. 4 is a flowchart illustrating a subprocess for determining if requested data comprises a media file which should be subject to the selective downloading.

Reference is next made to FIG. 4 which illustrates operations 400 for execution by a mobile communication device 201 for determining if requested data comprises a media file for selective downloading using "large" file delivery in accordance with one example embodiment of the present disclosure. The operations 400 may be executed by a Web browser or other application 258 on the mobile communication device 201 which access media files such as media viewer or player applications, particularly streaming media applications. The operations 400 are a subprocess that may be used in implementing steps 304 and 306, i.e., determining an indication of the requested data and determining if the indication matches a download rule 276 for "large" file delivery.

In the first step 402, the mobile communication device 201 determines if the requested data comprises a media file. This may be implemented in several ways. In some embodiments, determining whether the requested data comprises a media file comprises comparing the file type of the requested data from the download request (step 302) against a list of predetermined media file types, and if the file type of the requested data is within the list of predetermined media file types, the data is determined to be a media file. The list of predetermined media file types may comprise one or a combination of predetermined lists of: (i) hypermedia files having embedded or linked objects; (ii) audio files; (iii) video files; (iv) image files; and (v) graphics files. The list of predetermined media file types may include other type of media or multimedia file types. Generally, a media file is considered to be an audio file, video file, image file, graphics file, or a hypermedia file having one or more embedded or linked audio files, video files, image files, graphics files.

Example hypermedia files which may be included in a predetermined list include, but are limited to, Hypertext Markup Language (HTML) documents, Wireless Markup Language (WML) documents, Compact HTML (cHTML) documents, Extensible HyperText Markup Language (xHTML) documents, Handheld Device Markup Language (HDML) documents or other Standard Generalized Markup Language (SGML) documents.

Example audio file types which may be included in a predetermined list include, but are limited to, Wave (WAV), Audio Interchange File Format (AIFF), AU, MP3, ATRAC, AAC, Vorbis, Windows Media Audio (WMA), FLAC, Shorten, Monkey's Audio, ATRAC Advanced Lossless, Apple Lossless, WMA Lossless, TTA, and WavPack files.

Example video file types which may be included in a predetermined list include, but are limited to, Windows Media Video Files (MVFs), Advanced System Format (ASF), Audio-Video Interleaved (AVI) and MPEG movie files.

Example image and graphics file types which may be included in a predetermined list include, but are limited to, JPEG, GIF, BMP, TIFF, RAW, IMG, PDF, SVG, and SWF files.

In other embodiments, determining whether the requested data comprises a media file comprises determining the application 258 on the mobile communication device 201 from which the download request (step 302) originated and comparing the application against a predetermined list of application classifications, and if the determined application is classified as a media application within the list of application classifications, the requested data is determined to be a media file. Typically, the predetermined list of application classifications comprises a list of local applications on the mobile communication device 201 each of which is associated with a classification of the application (e.g., media/non-media application, limit/no-limit etc.) that allows the mobile communication device 201 to determine whether the data files requested from this application should be filtered by the operations 400. The predetermined list of application classifications may be stored in memory of the mobile communication device 201, for example, within the download preferences.

If the requested data is determined not to comprise a media file, the requested data is not "large" and the operations 400 proceed to step 408 where a determination that the requested data does not match a download rule for "large" file delivery is returned (for example, to the operations 300) and the operations 400 end.

If the requested data is determined to comprise a media file, the operations proceed to optional step 404 where the size of the requested data is determined. Steps 404 and 406 may not be performed in all embodiments, in which case the operations 400 proceed to step 410 where a determination that the requested data matches a download rule for "large" file delivery is returned (for example, to the operations 300) and the operations 400 end.

The size of the requested data may be determined by requesting the size of the data from the content source where the requested data is located. The size may be obtained by requesting and receiving size information from a content server 136 where the requested data is located. The content server 136 may implement a proprietary solution for providing size information in respect to a download request from a communication device, such as a proprietary header or metadata solution for non-hypermedia and non-HTML (HyperText Markup Language) documents. The present disclosure is not concerned with how size information is determined and stored by content servers 136, but with the use of size information obtained from content servers 136 in response to a request for such information. Accordingly, solutions for determining and storing size information in association with content (such as media data) maintained by a content server 136 are not described herein. However, such solutions would appreciated by persons ordinarily skilled in the art.

Alternatively, the size of the requested data may be determined by requesting, receiving and analysing a header or header data concerning a hypermedia document such as an HTML document from the content server 136 or Web server 134 where the requested data is located. Headers of an HTML document may be obtained via a HTTP HEAD request. Header data often comprises metadata which includes information about the media content including the size of the hypermedia document. Header information may be obtained via an intermediary such as a proxy server.

Next, in step 406 the determined size of the media file is compared against a predetermined size threshold (e.g., x MB). In some embodiments, there may be different thresholds for each data type (e.g., hypermedia, audio data, video data, images, etc.) or each particular file type. If the determined size is less than the predetermined threshold, the requested data is not "large" and the operations 400 proceed to step 408 where a determination that the requested data does not match a download rule for "large" file delivery is returned (for example, to the operations 300) and the operations 400 end.

If the determined size is greater than or equal to the predetermined threshold, the requested data is "large" and the operations 400 proceed to step 410 where a determination that the requested data matches a download rule for "large" file delivery is returned (for example, to the operations 300) and the operations 400 end.

It will also be appreciated that if the requested data comprises one or more data files, the operations 400 may be performed for each data file in the requested data.

Figure 5:
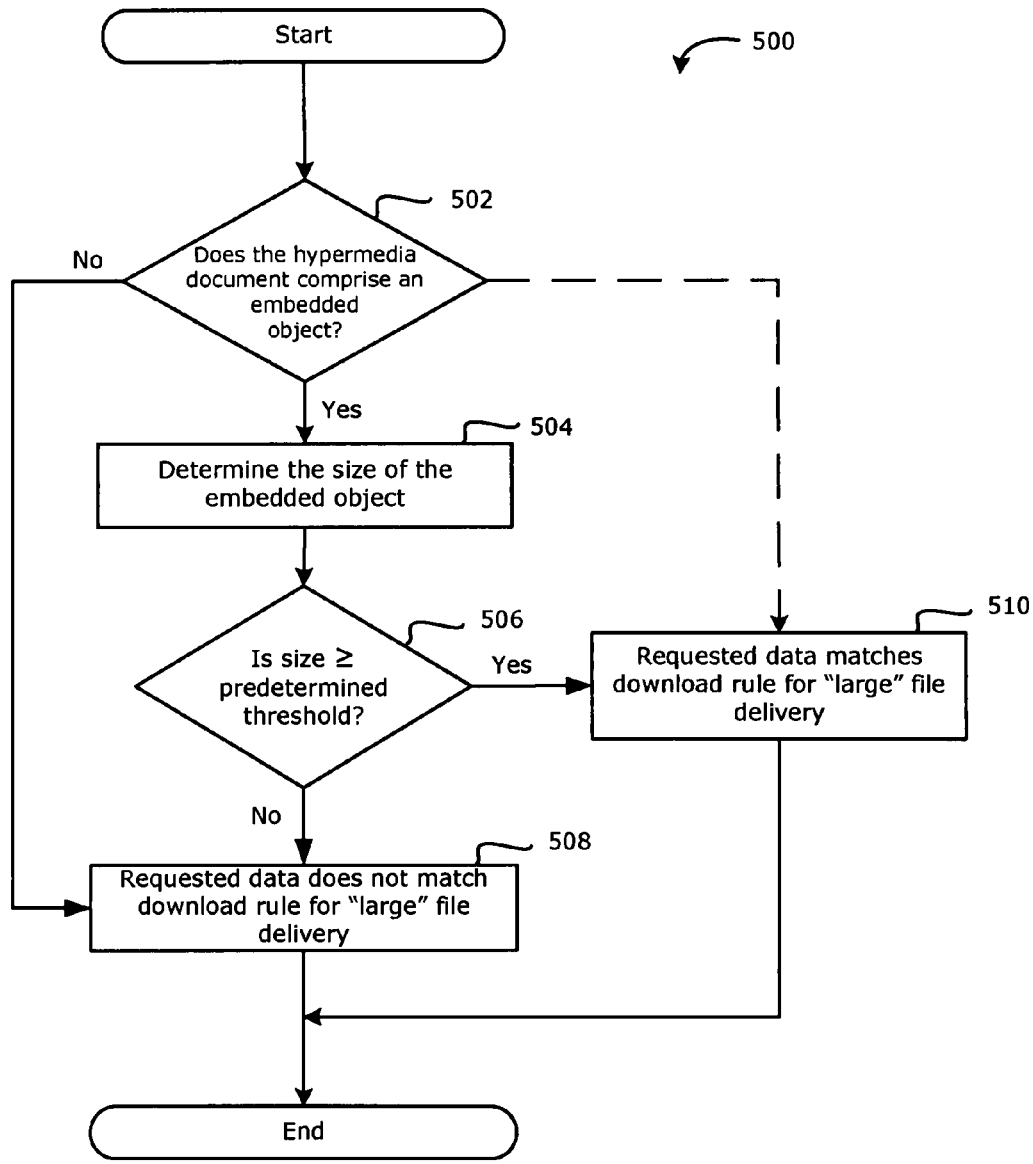
FIG. 5 is a flowchart illustrating a subprocess for determining if requested data comprises a hypermedia document with one or more embedded objects which should be subject to the selective downloading.

An Example Method for Determining if Requested Data Comprises "Large" HTTP (Hypertext Transfer Protocol) Content Reference is next made to FIG. 5 which illustrates operations 500 for determining if requested data comprises HTTP (hypertext transfer protocol) content for downloading using "large" file delivery in accordance with one example embodiment of the present disclosure. The operations 500 may be executed by a Web browser or other application 258 on the mobile communication device 201 which access hypermedia documents such a media player or email client. The operations 500 are a subprocess that may be used in implementing steps 304 and 306, i.e., determining an indication of the requested data and determining if the indication matches a download rule 276 for "large" file delivery.

In the first step 502, the mobile communication device 201 determines if the requested hypermedia document, such as an HTML document, comprises one or more embedded objects. If the HTML document does not comprise an embedded object, the requested data is not "large" and the operations 500 proceed to step 508 where a determination that the requested data does not match a download rule for "large" file delivery is returned (for example, to the operations 300) and the operations 500 end.

If the HTML document comprises an embedded object, operations 500 proceed to optional step 504 where the size of the embedded object is determined. Steps 504 and 506 may not be performed in all embodiments, in which case the operations 500 proceed to step 510 where a determination that the requested data matches a download rule for "large" file delivery is returned (for example, to the operations 300) and the operations 500 end.

Next, in step 506 the determined size of the embedded object is compared against a predetermined size threshold. If the determined size is less than the predetermined threshold, the requested data is not "large" and the operations 500 proceed to step 508 where a determination that the requested data does not match a download rule for "large" file delivery is returned (for example, to the operations 300) and the operations 500 end.

If the determined size is greater than or equal to the predetermined threshold, the requested data is "large" and the operations 500 proceed to step 510 where a determination that the requested data matches a download rule for "large" file delivery is returned (for example, to the operations 300) and the operations 500 end.

In one embodiment, the step 504 of determining the size of the embedded objects comprises determining the data length attribute of the embedded object stored in an object tag in the HTML document. This step may be performed by the Web browser on the mobile communication device 201 in response to a user request to access a Web page or other HTML document. The data length attribute may be obtained by requesting and receiving the HTML document from the content server 136 without downloading the embedded objects. The downloaded HTML document may then be analyzed in terms of the data length attribute of the embedded objects in the HTML document. Next, in step 506 the data length attribute is compared to the predetermined threshold. If the data length attribute is less than the predetermined threshold, the requested data is not "large" and the operations 500 proceed to step 508 where a determination that the requested data does not match a download rule for "large" file delivery is returned (for example, to the operations 300) and the operations 500 end.

If the data length attribute is greater than or equal to the predetermined threshold, the requested data is "large" and the operations 500 proceed to step 510 where a determination that the requested data matches a download rule for "large" file delivery is returned (for example, to the operations 300) and the operations 500 end.

Alternately, if the content server 136 (or other content source) is accessed via a proxy server, the data length attribute of embedded objects may be determined by the proxy server used for accessing the requested data from the content source as an intermediary. In some embodiments, the mobile data delivery module of the network server 120 acts as a proxy server for the mobile communication device 201 which optimizes the requested data in accordance with the runtime environment and/or technical capabilities of the mobile communication device 201 which requested the data. In response to a request to download data, the mobile data delivery module generates an optimized HTML document in accordance with the runtime environment and/or technical capabilities of the mobile communication device 201, and transmits the optimized HTML document to the mobile communication device 201. In such embodiments, the proxy server may determine the size of embedded objects and generate a modified and/or optimized HTML document in which a corresponding data length attribute object is inserted, the optimized HTML document being transmitted to the mobile communication device 201.

In other embodiments, the step 504 of determining the size of the embedded objects comprises requesting and receiving an HTTP header of the requested HTML document from the content source (i.e., an HTTP content server 136, Web server 134), in some embodiments via an intermediary such as a proxy server. HTTP Headers of an HTML document may be obtained via a HTTP HEAD request without downloading the HTML document itself. Headers often comprise metadata which includes information about the document including its size. The HTTP header of the HTML document may comprise a content-length header. The content-length header is an HTTP header that indicates the size of an HTML document or an embedded object. In some embodiments, the size of the embedded object(s) is determined by requesting the HTTP header(s) of the embedded object(s) via an HTTP HEAD request. An HTTP HEAD request on the HTML document will not return headers which include the size of any embedded objects or linked objects. The returned HTTP headers relate to the HTML document itself. Therefore, to determine the size of embedded objects an HTML object handler/module of the HTTP server typically has to perform a HEAD request on specific embedded objects to determine its size. HTML object handlers/modules are known in the art will not be described herein. The downloaded HTTP headers can then be analysed locally on the mobile communication device 201.

If the content server 136 (or other content source) is accessed via a proxy server, the step of requesting the HTTP header(s) of the HTML document is performed by the proxy server used for accessing the requested data from the content source as an intermediary. In some embodiments, the mobile data delivery module of the network server 120 acts as a proxy server for the mobile communication device 201 which optimizes the requested data in accordance with the runtime environment and/or technical capabilities of the mobile communication device 201 which requested the data. In response to a request to download data, the mobile data delivery module generates an optimized HTML document in accordance with the runtime environment and/or technical capabilities of the mobile communication device 201, and transmits the optimized HTML document to the mobile communication device 201. In such embodiments, the proxy server may request the HTTP header of the HTML document and generate a modified and/or optimized HTML document which includes in its HTTP header(s) the content-length header of the one or more embedded objects as an indication of size.

It will also be appreciated that if the HTML document comprises more than one embedded object (i.e. audio file, video file, image file, or graphics file, etc.), the operations 500 are repeated for each embedded object in the requested HTML document. In some embodiments, the step 506 of comparing the size of the embedded object against the predetermined threshold could be based on the total size of all embedded objects (which may be determined using data length attributes or content-length header of the embedded objects as described above).

In other embodiments, the operations 500 may be adapted for determining the size of linked objects (i.e. audio file, video file, image file, or graphics file, etc.) in addition to, or instead of, embedded objects.

It will be appreciated that while the above-described example embodiments describe methods and processes implemented in software (e.g., a computer program, computer code modules or code components) executed primarily by the mobile communication device 201, in other embodiments some of the process steps executed by the mobile communication device 201 may be performed by the network server 120 (for example, by the mobile data delivery module), proxy server, the wireless network gateway 110 and/or a combination thereof. For example, determining the indication of the size (or type) of the requested data and selecting the communication medium may occur on the network server 120, the wireless network gateway 110 and/or a combination thereof rather than the mobile communication device 201, provided the selection of the communication medium is provided to the mobile communication device 201 prior to download. It can be appreciated that different steps of the above-described methods and processes may be performed by different components of the communication system 100 in different embodiments.

Figure 6:
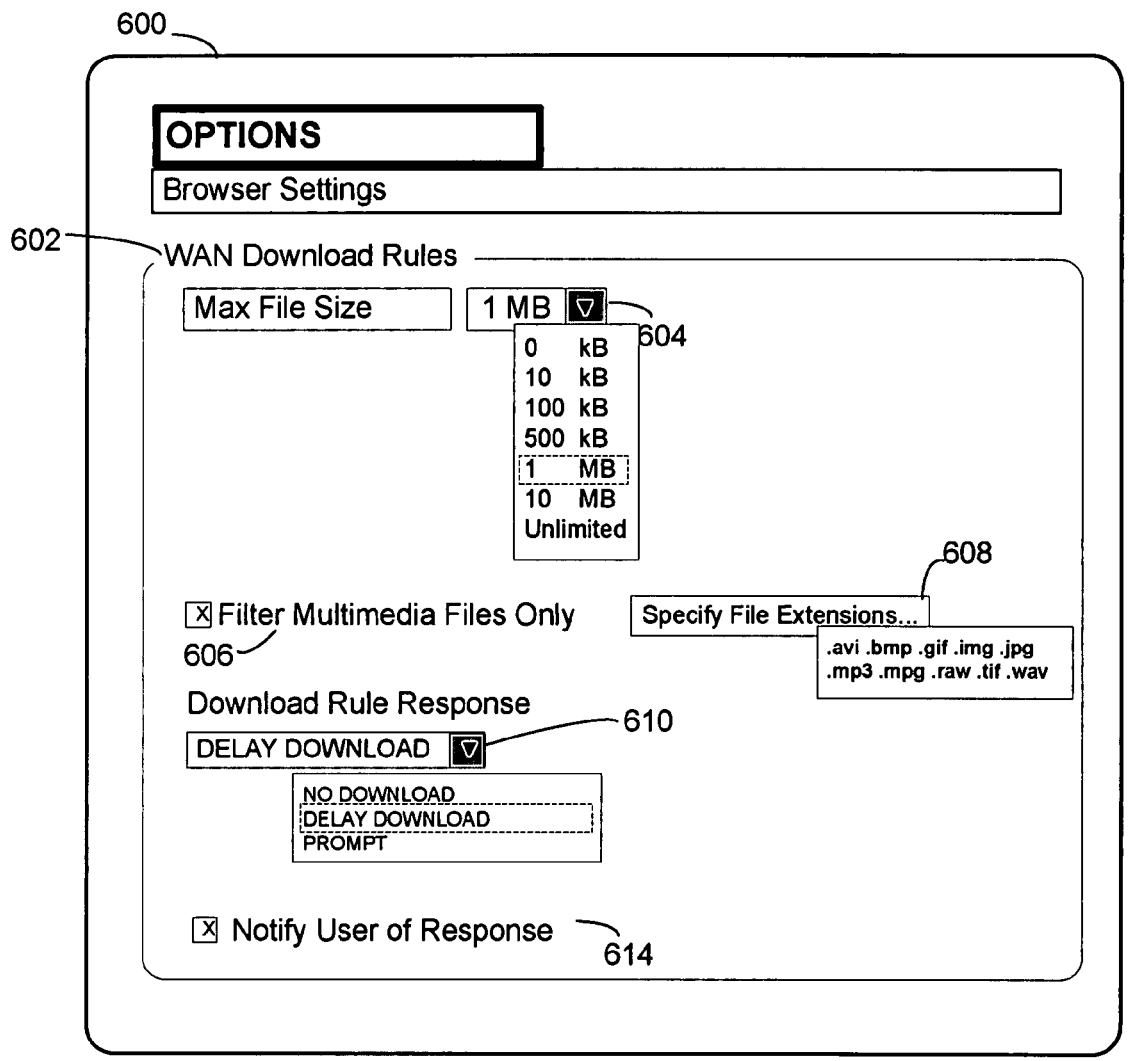
FIG. 6 shows an example download options user interface shown on a display of the mobile communication device of FIG. 2.

Reference is now made to FIG. 6 which illustrates an example "download options" user interface 600 shown on a display 242 of the mobile communication device 201. The user interface 600 in the shown embodiment is for a Web browser on the mobile communication device 201, however a similar user interface may be implemented for other applications 258 on the mobile communication device 201 which access remote data such as media viewer or player applications, particularly streaming media applications. The user interface 600 may be configured by a user/subscriber of the mobile communication device 201, an IT system administrator, the manufacturer, a network provider, or potentially other parties who may be interested in controlling downloads to the mobile communication device 201, for example, to limit content or large data files downloaded over a high cost network.

The user interface 600 may have a sub-menu 602 for example to permit a user to configure the download rules 276 for a wireless WAN 102 or cellular data network. For example, the configuration of the user interface may be used to modify the methods 300, 400 or 500 performed by the mobile communication device 201, as appropriate. As shown, the sub-menu includes a max file size menu 604 which sets a predetermined file size threshold, a multimedia toggle 606, a file extension menu 608, a download rule response menu 610, and a notify user toggle 614.

The max file size menu 604 permits the user to configure the maximum file size that may be downloaded under the higher cost communication medium. In the extreme cases, "0 kB" represents that no data files will be accessible over the WAN network, and "Unlimited" represents that all data files will be accessible over the WAN network. The multimedia toggle 606 permits a user to only filter multimedia files. The multimedia toggle 606 can thus be used as an initial filter for data files or can be used as a complete filter (i.e., by setting the max file size menu 604 to 0 kB). The multimedia toggle 606 may be facilitated by using the file extension menu 608, whereby the user can designate which file extensions will be initially selected for further processing. Although multimedia files are shown as an example (because of their typical large file sizes), it can be appreciated that any file extension can be designated in the file extension menu 608. The download rule response menu 610, shown as a dropdown menu, gives the user the available response of the device 200 for when a data file exceeds the maximum file size as set out in max file size menu 604. As shown, the user choose to stop the download of the data file by selecting "NO DOWNLOAD", choose to wait until a lower cost alternate communication medium is available by selecting "DELAY DOWNLOAD", or choose to be given the option at runtime to select whether a lower cost alternate communication medium should be used by selecting "PROMPT". Alternate communication mediums may be selected based on a download setting or priority list as described above. Under the "DELAY DOWNLOAD", if an alternate communication medium is already available, the download may commence using the alternate communication medium in which case there may be little or no delay. The notify user toggle 614 allows the user to be notified when a response is taken, i.e., when the downloading of the data file is stopped or delayed. For example, a notification may be displayed on the display 242 of the mobile communication device 201 and/or a sound may be produced via the speaker 256.

Figure 7:
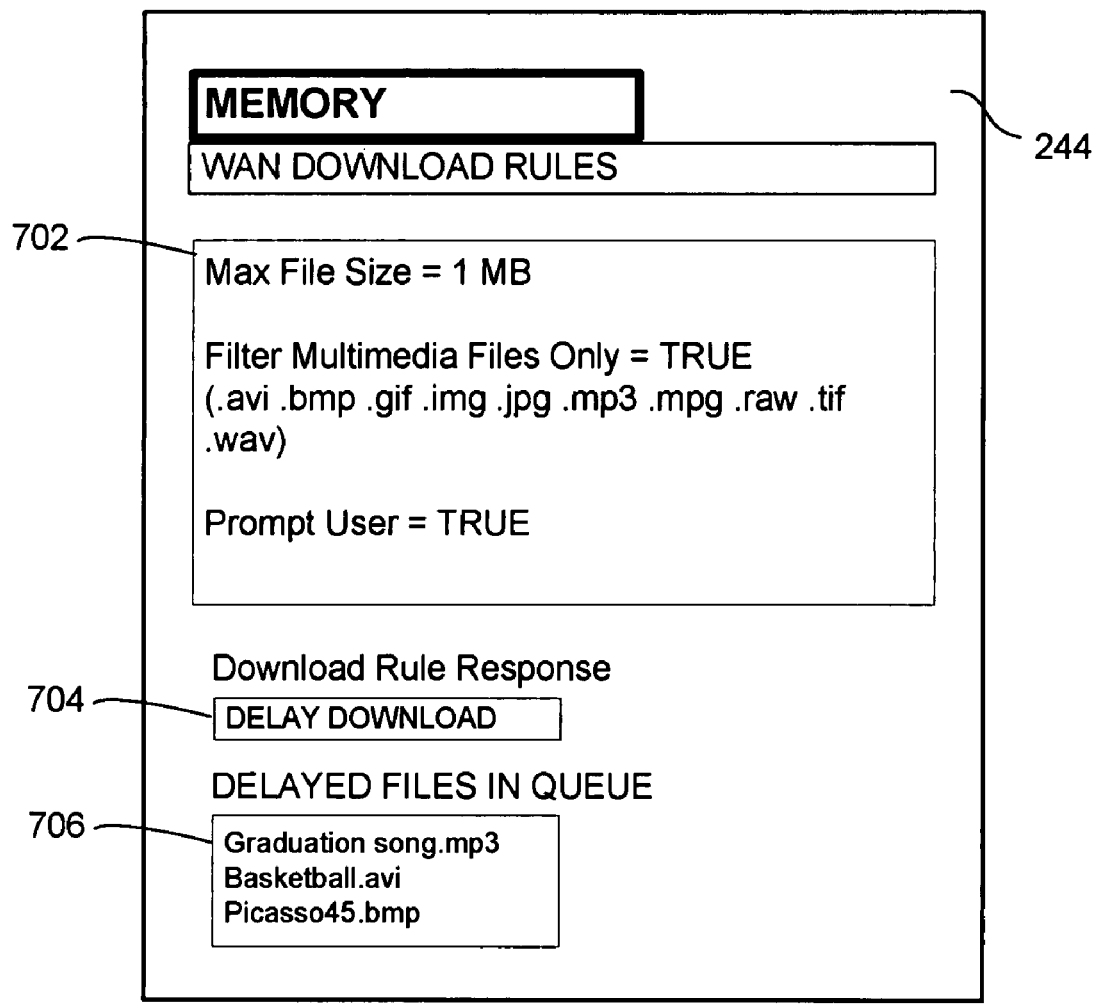
FIG. 7 shows an example of a data object used by a controller of the mobile communication device of FIG. 2.

Reference is now made to FIG. 7 which illustrates a data object 702 corresponding to a configuration of the user interface 600 (FIG. 6). The data object may for example be stored in flash memory 244 for accessing by the appropriate application 258 such as the Web browser. As shown, the data object 702 corresponds to the maximum file size (shown as 1 MB), the multimedia toggle (shown as TRUE), the types of file extensions to be filtered, and the notify user toggle (shown as TRUE). The data object 704 shows the response of the mobile communication device 201 (shown as DELAY DOWNLOAD) when a download request matches the current WAN download rule (i.e., the requested data comprises a media file of predefined type 608 and is greater than or equal to the max file size 604). In addition, data object 706 shows a list (e.g., a queue, stack, or other configuration) showing the files that were delayed from downloading. When a lower cost communication medium is available, these files may be automatically or manually (i.e., by prompting the user) be downloaded into the mobile communication device 201.

While downloading streaming data is discussed, it will be appreciated that "live" streaming data cannot be delayed as described above in the operations 300. Accordingly, only cached streaming data may be delayed for download in accordance with the operations 300. However, if the communication medium for such "large" media is available, such as Wi-Fi™, live streaming data can be downloaded to the mobile communication device.

Although reference has been made to certain wireless network types and standards for the purpose of illustration, such as the IEEE 802.11x standards, it will be appreciated that the present disclosure is intended to cover all further revisions, supplements, additions and replacements to the referenced network types and standards, whether or not explicitly described above. For example, while wireless network alternatives to the cellular data network of the wireless WAN 102 have been described primarily as being WLAN or Wi-Fi™, it will be appreciated that other wireless network types may be used such as, for example, the IEEE 802.16 standard or WirelessMAN (Wireless Metropolitan Area Network) standard commercially known as WiMAX™.

In accordance with one embodiment, there is provided a method on a mobile communication device for downloading data from a content source to the mobile communication device, the mobile communication device being configured for connecting to at least cellular data networks and wireless local area networks (WLANs), the method comprising: receiving a request to download data; determining if the requested data comprises a media file; selecting a communication medium for downloading the requested data in accordance with whether the requested data comprises a media file; and downloading the requested data to the mobile communication device using the selected communication medium.

The method may further comprise: determining whether the selected communication medium is available; downloading the requested data to the mobile communication device over the selected communication medium if it is available; and delaying the download if the selected communication medium is not available.

The download may be delayed until the selected communication medium is available or a predetermined amount of time. The method may further comprise: selecting an alternative communication medium after the expiry of the predetermined amount of time.

The communication medium may be selected from the following communication mediums: a cellular data network, a WLAN, a serial data interface, or a short-range wireless communication interface. The short-range wireless communication interface may be a Bluetooth interface.

The selecting may be based on the availability of the communication mediums or a priority list of the communication mediums. The priority list may be selected from a first priority list comprising a list of communication mediums in a descending order selected to lower data charges or second priority list comprising a list of communication mediums in a descending order selected to lower download times.

In accordance with another embodiment, there is provided a method on a mobile communication device for downloading data from a content source to the mobile communication device, the mobile communication device being configured for connecting to at least cellular data networks and wireless local area networks (WLANs), the method comprising: receiving a request to download data; determining an indication of size of the requested data; selecting a communication medium for downloading the requested data in accordance with whether the indication of size indicates that the requested data is large; and downloading the requested data to the mobile communication device using the selected communication medium.

Determining the indication of size of the requested data may comprise: determining the size of the requested data; determining if the size of the requested data is greater than or equal to a predetermined threshold; wherein the selection of the communication medium is in accordance with whether the size of the requested data is greater than or equal to the predetermined threshold. Determining the size of the requested data may comprise requesting size information associated with the requested data from the content source. The size information may be metadata or header data.

Determining the indication of size of the requested data may comprise: determining if the requested data comprises a file type which has been classified determined to be large.

Determining the indication of size of the requested data may comprise: determining an application on the mobile communication device from which the download request originated; and determining if the application has been classified as using large data files.

In accordance with a further embodiment, there is provided a method for downloading data from a content source to the mobile communication device, the mobile communication device being configured for connecting to at least cellular data networks and wireless local area networks (WLANs), the method comprising: receiving a request to download an HTML (HyperText Markup Language) document; determining whether the HTML document includes any embedded objects; if the HTML document includes an embedded object: determining whether the size of the embedded object is greater than or equal to a predetermined threshold; selecting a communication medium for downloading the embedded object in accordance with whether the size of the embedded object is greater than or equal to the predetermined threshold; and downloading the embedded object to the mobile communication device using the selected communication medium.

In accordance with a further embodiment, there is provided a mobile communication device, comprising: a processor for controlling the operation of the mobile communication device; a communication subsystem connected to the processor for connecting to at least cellular data networks and wireless local area networks (WLANs); a memory coupled to the processor and having data and instructions stored thereon, the data and instructions configuring the operation of the processor, the processor being configured to: receive a request to download data; determine if the requested data comprises a media file; select a communication medium for downloading the requested data in accordance with whether the requested data comprises a media file; and download the requested data to the mobile communication device using the selected communication medium.

In accordance with a further embodiment, there is provided a mobile communication device, comprising: a processor for controlling the operation of the mobile communication device; a communication subsystem connected to the processor for connecting to at least cellular data networks and wireless local area networks (WLANs); a memory coupled to the processor and having data and instructions stored thereon, the data and instructions configuring the operation of the processor, the processor being configured to: receive a request to download data; determine an indication of size of the requested data; select a communication medium for downloading the requested data in accordance with whether the indication of size indicates that the requested data is large; and download the requested data to the mobile communication device using the selected communication medium.

In accordance with a further embodiment, there is provided a mobile communication device, comprising: a processor for controlling the operation of the mobile communication device; a communication subsystem connected to the processor for connecting to at least cellular data networks and wireless local area networks (WLANs); a memory coupled to the processor and having data and instructions stored thereon, the data and instructions configuring the operation of the processor, the processor being configured to: receive a request to download an HTML (HyperText Markup Language) document; determine whether the HTML document includes any embedded objects; if the HTML document includes an embedded object: determine whether the size of the embedded object is greater than or equal to a predetermined threshold; select a communication medium for downloading the embedded object in accordance with whether the size of the embedded object is greater than or equal to the predetermined threshold; and download the embedded object to the mobile communication device using the selected communication medium.

In accordance with a further embodiment, there is provided a computer program product comprising a computer readable medium having stored thereon computer program instructions for implementing a method on a mobile communication device for downloading data from a content source to the mobile communication device, the mobile communication device being configured for connecting to at least cellular data networks and wireless local area networks (WLANs), the computer executable instructions comprising instructions for: receiving a request to download data; determining if the requested data comprises a media file; selecting a communication medium for downloading the requested data in accordance with whether the requested data comprises a media file; and downloading the requested data to the mobile communication device using the selected communication medium.

In accordance with a further embodiment, there is provided a computer program product comprising a computer readable medium having stored thereon computer program instructions for implementing a method on a mobile communication device for downloading data from a content source to the mobile communication device, the mobile communication device being configured for connecting to at least cellular data networks and wireless local area networks (WLANs), the computer executable instructions comprising instructions for: receiving a request to download data; determining an indication of size of the requested data; selecting a communication medium for downloading the requested data in accordance with whether the indication of size indicates that the requested data is large; and downloading the requested data to the mobile communication device using the selected communication medium.

In accordance with a further embodiment, there is provided a computer program product comprising a computer readable medium having stored thereon computer program instructions for implementing a method on a mobile communication device for downloading data from a content source to the mobile communication device, the mobile communication device being configured for connecting to at least cellular data networks and wireless local area networks (WLANs), the computer executable instructions comprising instructions for: receiving a request to download an HTML (HyperText Markup Language) document; determining whether the HTML document includes any embedded objects; if the HTML document includes an embedded object: determining whether the size of the embedded object is greater than or equal to a predetermined threshold; selecting a communication medium for downloading the embedded object in accordance with whether the size of the embedded object is greater than or equal to the predetermined threshold; and downloading the embedded object to the mobile communication device using the selected communication medium.

In accordance with further embodiments of the present application, there is provided an apparatus such as a mobile communication and proxy server, a method for adapting such apparatus, articles of manufacture such as a machine or computer readable medium having program instructions recorded thereon for practising the method of the application, as well as a computer data signal having program instructions recorded therein for practising the method of the application.

While the present disclosure is primarily described as a method, a person of ordinary skill in the art will understand that the present disclosure is also directed to various apparatus such as a mobile communication device, proxy server, and network server for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure. In addition, a communication system comprising a server and a plurality of mobile communication devices connected via a wireless communication network, in which the server is configured to implement at least some of the processes described herein, and in which one or more of the mobile communication devices are configured to implement at least some of the processes described herein, also comes within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for downloading data from a content source to a mobile communication device, the mobile communication device being configured for connecting to at least cellular data networks and wireless local area networks (WLANs), the method comprising:

receiving a request to download an HTML (HyperText Markup Language) document;

determining whether the HTML document includes any embedded objects;

if the HTML document includes an embedded object:

determining whether the size of the embedded object is greater than or equal to a predetermined threshold;

selecting a communication medium for downloading the embedded object in accordance with whether the size of the embedded object is greater than or equal to the predetermined threshold; and downloading the embedded object to the mobile communication device using the selected communication medium, wherein the determining whether the size of the embedded object is greater than or equal to the predetermined threshold comprises:

determining by a proxy server for accessing the HTML document from the content source the size of the embedded object;

generating by the proxy server a modified HTML document including data length attribute in an object tag, the data length attribute providing the size of the embedded object in the HTML document;

transmitting the modified HTML document to the mobile communication device;

receiving the modified HTML document on the mobile communication device; and determining on the mobile communication device if the data length attribute is greater than or equal to the predetermined threshold.

2. The method of claim 1, wherein the determining whether the size of the embedded object is greater than or equal to the predetermined threshold further comprises downloading the HTML document without the embedded object.

3. The method of claim 1, further comprising:

if the HTML document does not include an embedded object, downloading the HTML document to the mobile communication device using any communication medium.

4. The method of claim 1, wherein the determining, selecting, and downloading operations are performed for each embedded object in the HTML document.

5. The method of claim 1, wherein the determining whether the size of the embedded object is greater than or equal to a predetermined threshold comprises:

identifying a data length attribute associated with the embedded object in an object tag of the HTML document; and determining if the data length attribute is greater than or equal to the predetermined threshold.

6. A method for downloading data from a content source to a mobile communication device, the mobile communication device being configured for connecting to at least cellular data networks and wireless local area networks (WLANs), the method comprising:

receiving a request to download an HTML (HyperText Markup Language) document;

determining whether the HTML document includes any embedded objects;

if the HTML document includes an embedded object:

determining whether the size of the embedded object is greater than or equal to a predetermined threshold;

selecting a communication medium for downloading the embedded object in accordance with whether the size of the embedded object is greater than or equal to the predetermined threshold; and downloading the embedded object to the mobile communication device using the selected communication medium, wherein the determining whether the size of the embedded object is greater than or equal to the predetermined threshold comprises:

requesting an Hypertext Transfer Protocol (HTTP) header of the embedded object; and determining if a content-length header in the HTTP header is greater than or equal to a predetermined threshold.

7. The method of claim 6, wherein the determining whether the size of the embedded object is greater than or equal to the predetermined threshold further comprises:

determining by a proxy server for accessing the HTML document from the content source the size of the embedded object;

generating by the proxy server a modified HTML document including a content-length header of the HTTP header, the content-length header of the HTTP header providing the size of the embedded object;

transmitting the modified HTML document to the mobile communication device;

receiving the modified HTML document on the mobile communication device; and determining on the mobile communication device if the content-length header in the HTTP header is greater than or equal to a predetermined threshold.

* * * * *